United States Patent [19]

Wantanabe

[11] Patent Number: 5,502,151
[45] Date of Patent: Mar. 26, 1996

[54] PROCESS FOR PREPARING POLYUREA AND POLYURETHANE-UREA RESIN

[75] Inventor: Haruo Wantanabe, Tokyo, Japan

[73] Assignee: Hodogaya Chemical Co., Ltd., Tokyo, Japan

[21] Appl. No.: 212,940

[22] Filed: Mar. 15, 1994

[30] Foreign Application Priority Data

Mar. 17, 1993 [JP] Japan .................................. 5-081116

[51] Int. Cl.⁶ .......................... C08G 18/32; C08G 18/60
[52] U.S. Cl. .................. 528/68; 528/76; 528/85
[58] Field of Search .................................. 528/68, 76, 85

[56] References Cited

U.S. PATENT DOCUMENTS 5,086,153  2/1992  Oyaizu ..................................... 528/68

FOREIGN PATENT DOCUMENTS 0343985  11/1989  European Pat. Off. .
0449616  10/1991  European Pat. Off. .
0467622   1/1992  European Pat. Off. .

OTHER PUBLICATIONS

Journal of Applied Polymer Science, vol. 35, No. 7, May 20, 1988, Bruce Hartmann, et al., "Thermal and Dynamic Mechanical Properties of Polyurethaneureas", pp. 1829–1852.

Primary Examiner—James J. Seidleck
Assistant Examiner—Duc Truong
Attorney, Agent, or Firm—Oblon, Spivak, McClelland, Maier, & Neustadt

[57] ABSTRACT

A process for preparing a polyurea resin or a polyurethane-urea resin is disclosed which comprises reacting a polyalkylene ether polyamine, wherein the polyalkylene ether moiety is a random copolymer of tetrahydrofuran and 3-methyltetrahydrofuran, with a polyisocyanate compound or an isocyanate group-terminated prepolymer.

10 Claims, No Drawings

PROCESS FOR PREPARING POLYUREA AND POLYURETHANE-UREA RESIN

FIELD OF THE INVENTION

This invention relates to a process for preparing a polyurea resin or a polyurethane-urea resin, and more particularly to a process for preparing an elastomer suitable for use in the preparation of paints, adhesives, fiber, synthetic leathers, etc. which has improved workability and provides a resin having improved physical properties.

BACKGROUND OF THE INVENTION

Processes for preparing polyurea resins are disclosed in the specifications of JP-A-56-135514 (the term "JP-A" as used herein means an "unexamined published Japanese patent application"), JP-B-60-32641 (the term "JP-B" as used herein means an "examined Japanese patent publication") and JP-B-64-2601, and processes for preparing polyurethane-urea resins are disclosed in the specifications of JP-A-50-132096, JP-B-61-54812 and U.S. Pat. No. 3,681, 290. Various polyamines are used in the preparation of these resins. Examples of aromatic amines conventionally used include toluenediamine, 1,2-, 1,3- or 1,4-diaminobenzene, 4,4'-diaminodiphenylmethane, methylenebis(2-chloroaniline), 4-chloro-3,5-diaminobenzoic isobutyl ester, trimethylenebis(4-aminobenzoate) and 1,4-diamino- 2,3-diphenylbutane.

Examples of aliphatic amines conventionally used include propylenediamine, tetramethylenediamine, pentamethylenediamine, hexamethylenediamine, trimethylhexamethylenediamine and polyalkylenepolyamines.

Of these amine compounds, the aromatic amines are used as the chain lengthening agents of urethane prepolymers or crosslinking agents because they have such properties that the mechanical strength, hardness or heat resistance of the resulting resins can be improved. However, the aromatic amines have a high melting point, and hence the mixing thereof with polyisocyanate compounds must be conducted at a high temperature (approximately from 60° to 100° C.), and curing must also be conducted at a high temperature to accelerate curing.

Among the aliphatic amine compounds, those having a low molecular weight are liquid at ordinary temperature. However, the reaction rate of the amine compounds having a low molecular weight with polyisocyanates is rapid, and it is not preferred that the amine compounds are used to obtain curable resins which require flexibility. Among the aliphatic amines, conventional polyalkylenepolyamines can be used to prepare curable resins ranging from resins having flexibility to resins having a high hardness. Accordingly, they are used as starting materials for polyurea resins and curing agents for urethane prepolymers. However, they must have crystallizability at ordinary temperature, the mixing thereof must be conducted at a high temperature because of high viscosity, and curing must be conducted at a high temperature. Further, the resulting curable resins have a problem with regard to mechanical properties.

SUMMARY OF THE INVENTION

An object of the present invention is to provide a process for preparing a polyurea resin and a polyurethaneurea resin, which has improved workability and provides the resins having improved mechanical properties.

The above-described object of the present invention has been achieved by providing processes for preparing a polyurea resin and a polyurethane-urea resin, wherein an amino compound (polyalkylene ether aminobenzoate) represented by the following general formula (I):

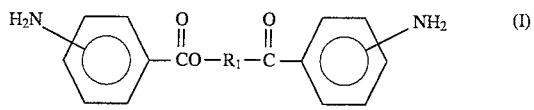

(wherein $R^1$ represents a polyalkylene ether group composed of, as constituent units, alkylene ether groups represented by the following general formulas (II) and (III) wherein the groups of general formulas (II) and (III) are randomly arranged; the polyalkylene ether group has an average molecular weight of 500 to 5,000; and the proportion of the group of general formula (III) in the polyalkylene ether group accounts for 5 to 40% by weight of the combined amount of the constituent groups of general formulas (II) and (III):

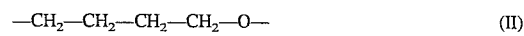

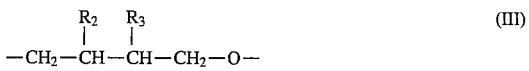

wherein either one of $R^2$ and $R^3$ represents a hydrogen atom and the other represents a methyl group) is reacted with a polyisocyanate compound and a urethane prepolymer, respectively.

DETAILED DESCRIPTION OF THE INVENTION

Now, the present invention will be illustrated in more detail below.

The processes of the present invention have some advantages in that the mixing of the polyalkylene ether aminobenzoate represented by formula (I) with the polyisocyanate compound or the urethane prepolymer can be conducted under low temperature (from 0° to 80° C.) and curing of the resulting composition can be conducted at ordinary temperature (from 10° to 30° C.) for 0.5 to 15 hours, while a resin having improved mechanical properties is provided.

1. Preparation of Polyalkylene Ether Aminobenzoate of Formula (I)

The random copolymerized polyalkylene ether moiety composed of the groups of general formulas (II) and (III) which is a portion of a polyalkylene ether aminobenzoate used as the amino compound in the present invention is a copolymer polyalkylene ether glycol of 3-methyltetrahydrofuran and tetrahydrofuran obtained by random copolymerizing tetrahydrofuran and 3-methyltetrahydrofuran in the presence of a catalyst for the ring opening polymerization of tetrahydrofuran such as proton acids (e.g., $HClO_4$, $HSO_3Cl$, $HBF_4$), ion complexes (e.g., $(C_2H_5)_3OBF_3$, $CH_3COSbCl_6$, $C_6H_5N_2PF_6$), $CH_3COCl$—$BF_3$, $SOCl_2$—$AlCl_3$ or $POCl_3$—$FeCl_3$ and conventional polymerization initiators optionally together with an acid anhydride and an accelerator. The copolymer moiety has an average molecular weight of 500 to 5,000, and preferably from 500 to 3,000. The average molecular weight means a number average molecular weight, and can be obtained, for example, by measuring the number of the hydroxyl groups present in the glycol by means of the acetylation method in which pyridine and acetic anhydride as an acetylating agent are used. The proportion of the group of general formula (III) in the polyalkylene ether group of the copolymer moiety is preferably 5 to 40% by weight, more preferably 10 to 30% by weight, of the combined amount of the constituent groups of general formulas (II) and (III).

The polyalkylene ether aminobenzoate can be prepared by reducing the nitrobenzoate compound of the polyalkylene ether glycol which can be obtained by reacting the polyalkylene ether glycol with 2-, 3- or 4-nitrobenzoyl chloride in the presence of an acid acceptor. Examples of the acid acceptor include inorganic or organic compounds which are basic such as pyridine, triethylamine, and an aqueous solution of sodium hydroxide.

The polyalkylene ether aminobenzoate is not crystallized even at a low temperature (0° C.) and is a useful material as a starting material for the preparation of novel polyurea and polyurethane-urea resins and as a curing agent for epoxy resins.

2. Preparation of Polyurea Resin

In the preparation of the polyurea resin from the polyisocyanate compound and the polyalkylene ether aminobenzoate of the present invention, the polyisocyanate compound and the polyalkylene ether aminobenzoate are reacted.

Examples of the polyisocyanate compound which can be used in the preparation of the polyurea resin include 4,4'-diphenylmethane diisocyanate, 2,4-tolylene diisocyanate, 2,6-tolylene diisocyanate, a mixture of 2,4- and 2,6-tolylene diisocyanates, m-phenylene diisocyanate, xylylene diisocyanate, hexamethylene diisocyanate, tetramethylene diisocyanate, 1,4-hexylene diisocyanate, 4,4'-biphenylene diisocyanate, 3,3'-dimethoxy-4,4'-biphenylenediisocyanate, 1,5-naphthalene diisocyanate, tetramethylxylene diisocyanate and 4,4'-diphenyl ether diisocyanate. Further, carbodiimide-modified 4,4'-diphenylmethane diisocyanate (liquid MDI) can be used. Preferred examples include 2,4-tolylene diisocyanate and carbodiimide-modified 4,4'-diphenylmethane diisocyanate.

The reaction is conducted by mixing the polyisocyanate compound and the polyalkylene ether aminobenzoate with stirring, preferably, at a temperature of 0° to 80° C. for 0.5 to 30 minutes. It is preferred that the polyisocyanate compound and the polyalkylene ether aminobenzoate are reacted in a molar ratio of from (1.0:0.90) to (1.0:0.99), more preferably (1.0:0.95) to (1.0:0.99).

A low-molecular amino compound may be used in combination with the polyalkylene ether aminobenzoate of the present invention.

3. Preparation of Polyurethane-Urea Resin

The polyurethane-urea resin can be prepared by preparing a isocyanate group-terminated urethane prepolymer (hereinafter referred to as a urethane prepolymer) from a polyisocyanate compound and a polyol and then reacting the resulting urethane prepolymer with the polyalkylene ether aminobenzoate of the present invention.

The polyisocyanate compound and the polyol are reacted in a molar ratio of from (1.0:0.85) to (1.0:0.30), preferably (1.0:0.70) to (1.0:0.45), at a temperature of 50 to 120° C. with stirring for 1 to 5 hours to obtain the urethane prepolymer.

Examples of the polyol which can be used in the preparation of the urethane prepolymer include polyether glycols, polyester glycols and polyether ester glycols obtained by the ring opening polymerization of ethylene oxide, propylene oxide, tetrahydrofuran or ε-caprolacton alone or by the ring opening copolymerization of two or more of these cyclic compounds; polyester glycols such as polyethylene adipate, polypropylene adipate and polybutylene adipate obtained by the reaction of an aliphatic glycol with a dicarboxylic acid; polyalkylene glycols such as polybutadiene having an unsaturated bond group; aromatic/aliphatic glycols obtained by adding an alkyl compound to an aromatic dihydroxy compound such as bisphenol A, 4,4'-dihydroxydiphenyl sulfone or 4,4'-dihydroxydiphenyl hydroquinone; and polycarbonate glycols obtained by reacting an aliphatic dihydroxy compound such as 1,3-propanediol, 1,4-butanediol, 1,5-pentanediol, 1,6-hexanediol, 2-methyl-1,3-propanediol, neopentyl glycol, 1,3-cyclohexanediol or 1,4-cyclohexanediol with phosgene or an alkylene carbonate. Preferred examples include polyether glycols such as polypropylene ether glycol and polytetramethylene ether glycol.

Examples of the polyisocyanate compound which can be used in the preparation of the urethane prepolymer are the same as those which can be used in the preparation of the polyurea resin. Preferred examples include 2,4-tolylene diisocyanate and carbodiimide-modified 4,4'-diphenylmethane diisocyanate.

It is preferred that the urethane prepolymer has the viscocity of from $5 \times 10^3$ to $9 \times 10^4$ cps at 20° C. The viscosity of the urethane prepolymer can be measured using a Vismetlon rotational viscometer.

The polyurethane-urea resin can be prepared by reacting the polyalkylene ether aminobenzoate of the present invention with the urethane prepolymer.

The reaction is conducted by mixing the polyalkylene ether aminobenzoate and the urethane prepolymer with stirring, preferably, at a temperature of 20° to 80° C. for 10 to 40 minutes. It is preferred that the polyalkylene ether aminobenzoate is used in such an amount that the molar ratio of the polyisocyanate compound: (polyol+polyalkylene ether aminobenzoate) ranges from (1.0:0.99) to (1.0:0.95) in the resulting polyurethane-urea resin composition.

If desired, the low-molecular amino compounds mentioned above may be optionally used when the polyalkylene ether aminobenzoate is added to the urethane prepolymer.

Furthermore, the polyurethane-urea resin may be prepared by one-shot method comprising previously mixing the polyol with the polyalkylene ether aminobenzoate and reacting the polyisocyanate therewith. However, the reaction rate of the polyalkylene ether aminobenzoate is rapider than that of the polyol, and hence a remarkable thickening phenomenon and the dispersibility of urea bond must be taken into consideration.

The present invention is now illustrated in greater detail by reference to the following examples which, however, are not to be construed as limiting the invention in any way. In the following examples, polyalkylene ether aminobenzoate is abbreviated to PTMA.

SYNTHESIS EXAMPLE 1

Into a 5-liter four-necked flask equipped with a thermometer, a dropping funnel, a condenser and a stirrer, there were charged 400.0 g (0.430 mol) of poly(tetramethylene/ 3-methyltetramethylene ether) glycol having a molecular weight of 929 (the content of 3-methyltetramethylene ether group moiety: 15% by weight) and 175.6 g (0.945 mol) p-nitrobenzoyl chloride, and two liters of toluene was added thereto. While mixing with stirring at room temperature, 100.6 g (0.994 mol) of triethylamine was added dropwise thereto. When the dropwise addition was completed, the temperature of the reaction mixture (solution) rose to about 60° C. Heating was conducted at that temperature, and the reaction was carried out for 5 hours while toluene was refluxed. After completion of the reaction, the reaction mixture was cooled to about room temperature. Triethylamine hydrochloride in the reaction mixture was recovered by filtration, and the filtrate was washed with an aqueous solution of sodium hydroxide, an aqueous solution of hydrochloric acid and then water. Toluene was distilled off from the toluene layer under reduced pressure to thereby obtain 490 g (yield: 93%) of the dinitro compound of poly(tetrahydrofuran/3-methyltetrahydrofuran ether) glycol as a light yellow liquid material.

Into a 2-liter four-necked flask equipped with a thermometer, a dropping funnel, a condenser and a stirrer, there was charged 470 g of the dinitro compound, and 1.2 liters of ethanol and 3.5 g of Pt/Pd/C (catalyst composed of platinum and palladium on carbon, 50% wet product, manufactured by Nippon Engelhard Ltd.) were added thereto. While stirring at room temperature, 57.7 g (1.15 mol) of hydrazine hydrate was added dropwise through the dropping funnel thereto over a period of 40 minutes. After completion of the dropwise addition, the temperature of the reaction mixture rose to 55° C. Further, heating was conducted and the reaction was carried out for 5 hours while ethanol was refluxed. After the reaction was completed, the reaction mixture was filtered. Ethanol in the filtrate was completely distilled off under normal pressure and reduced pressure to thereby obtain 380 g (yield: 85%) of the product as a light yellow transparent low-viscosity liquid material. NMR, GPC and infrared absorption spectrum analysis showed that the product was the desired poly(tetrahydrofuran/3-methyltetrahydrofuran ether) aminobenzoate. The viscosity of the product was measured with E-type viscometer (manufacture by Tokyo Keiki Co., Ltd.), and the product was found to have a viscosity of 3080 cps at 25° C. The measurement of the melting point with a differential scanning calorimeter (DSC-8230 type manufactured by Rigaku KK) was made, and there were not found fusion and a crystallization phenomenon showing a melting point in the range of from −80° to 80° C. The number of terminal amino groups determined by perchlorate titration using acetic acid as the solvent and methylrosaniline chloride as the indicator was 2.0. (The product is hereinafter referred to as PTMA-1.)

SYNTHESIS EXAMPLE 2

In the same manner as in Synthesis Example 1, the nitration reaction and the amination reaction were carried out by using poly(tetramethylene/3-methyltetramethylene ether) glycol having a molecular weight of 2070 (the content of 3-methyltetramethylene ether group moiety: 15% by weight) to obtain a light yellow transparent product having a viscosity of 4100 cps/25° C. The measurement of the melting point with the differential scanning calorimeter was made, and there were not found fusion and a crystallization phenomenon in the range of from −80° to 80° C. The number of terminal amino groups was 2.0. (The product is hereinafter referred to as PTMA-2.)

EXAMPLE 1

There were mixed 8.0 g (0.0459 mol) of 2,4-tolylene diisocyanate (Coronate T-100 manufactured by Nippon Polyurethane Industry Co., Ltd.) and 50.9 g (0.0436 mol) of PTMA-1 with stirring at 40° C. in a separable flask for 2 minutes. The product was defoamed under reduced pressure and cast into a glass frame to prepare a sheet composed of the polyurea resin. Curing time and the mechanical properties of the resulting sheet are shown in Table 1 below.

EXAMPLE 2

There were mixed 10.1 g (0.0404 mol) of 4,4'-diphenylmethane diisocyanate (Millionate MT manufactured by Nippon Polyurethane Industry Co., Ltd.) and 45.0 g (0.0386 mol) of PTMA-1 with stirring at 40° C in a separable flask for 2 minutes. The product was defoamed under reduced pressure and cast into a glass frame to prepare a sheet composed of the polyurea resin. Curing time and the mechanical properties of the resulting sheet are shown in Table 1.

EXAMPLE 3

There were mixed 12.8 g (0.0439 mol) of liquid MDI (Millionate MTL manufactured by Nippon Polyurethane Industry Co., Ltd.) and 50.0 g (0.0428 mol) of PTMA-1 with stirring at 25° C. for 2 minutes. The product was defoamed under reduced pressure and cast into a glass frame to prepare a sheet composed of the polyurea resin. Curing time and the mechanical properties of the resulting sheet are shown in Table 1.

EXAMPLE 4

There were mixed 11.5 g (0.0394 mol) of liquid MDI (Millionate MTL manufactured by Nippon Polyurethane Industry Co., Ltd.) and 45.0 g (0.0386 mol) of PTMA-1 with stirring at 25° C. in a separable flask for 2 minutes. The product was defoamed under reduced pressure and cast into a glass frame to prepare a sheet composed of the polyurea resin. Curing time and the mechanical properties of the resulting sheet are shown in Table 1.

EXAMPLE 5

There were mixed 4.2 g (0.0241 mol) of 2,4-tolylene diisocyanate and 55.0 g (0.0238 mol) of PTMA-2 with stirring at 25° C. in a separable flask for 2 minutes. The product was defoamed under reduced pressure and cast into a glass frame to prepare a sheet composed of the polyurea resin. Curing time and the mechanical properties of the resulting sheet are shown in Table 1.

EXAMPLE 6

There were mixed 5.8 g (0.0199 mol) of liquid MDI (Millionate MTL manufactured by Nippon Polyurethane Industry Co., Ltd.) and 45.0 g (0.0195 mol) of PTMA-2 with stirring at 25° C. in a separable flask for 2 minutes. The product was defoamed under reduced pressure and cast into a glass frame to prepare a sheet composed of the polyurea resin. Curing time and the mechanical properties of the resulting sheet are shown in Table 1.

COMPARATIVE EXAMPLE 1

There were mixed 10.0 g (0.040 mol) of 4,4'-diphenylmethane diisocyanate and 47.2 g (0.0381 mol) of polytetramethylene ether di-p-aminobenzoate having a molecular weight of 1238 (Elasmer 1000 manufactured by Ihara Chemical Industry Co., Ltd.) with stirring at 50° C. for 3 minutes. The product was defoamed under reduced pressure and cast into a glass frame to prepare a sheet composed of the polyurea resin. Curing time and the mechanical properties of the resulting sheet are shown in Table 1.

COMPARATIVE EXAMPLE 2

There were mixed 8.0 g (0.0459 mol) of 2,4-tolylene diisocyanate and 54.1 g (0.0437 mol) of polytetramethylene ether di p-aminobenzoate having a molecular weight of 1238 (Elasmer 1000) with stirring at 50° C. for 3 minutes. The product was defoamed under reduced pressure and cast into a glass frame to prepare a sheet composed of the polyurea resin. Curing time and the mechanical properties of the resulting sheet are shown in Table 1.

TABLE 1

| | Isocyanate Compound (NCO) | Amino Compound (NH$_2$) | NCO/NH$_2$ (molar ratio) | Curing Time at 25° C. (hrs) | Properties of Cured Sheet | | |
|---|---|---|---|---|---|---|---|
| | | | | | Tensile Strength (kg/cm$^2$) | Tensile Elongation (%) | Tear Strength (kg/cm) |
| Example | | | | | | | |
| 1 | T-100 | PTMA-1 | 1.05 | 1.8 | 180 | 310 | 18 |
| 2 | MT | PTMA-1 | 1.05 | 0.9 | 460 | 800 | 115 |
| 3 | MTL | PTMA-1 | 1.05 | 0.8 | 190 | 350 | 19 |
| 4 | MTL | PTMA-1 | 1.02 | 0.7 | 620 | 520 | 88 |
| 5 | T-100 | PTMA-2 | 1.02 | 1.5 | 105 | 1200 | 15 |
| 6 | MTL | PTMA-2 | 1.02 | 1.2 | 390 | 800 | 55 |
| Comp. Ex. 1 | MT | Elasmer 1000 | 1.05 | 0.9 | 400 | 650 | 68 |
| Comp. Ex. 2 | T-100 | Elasmer 1000 | 1.05 | 2.0 | 150 | 300 | 16 |

In Table 1, the term "curing time at 25° C." refers to a time taken until the viscous liquid of the mixture at 25° C. is solidified.

In Table 1, the properties of the cured sheet are values obtained by making the measurement 72 hours after curing according to JIS K-6301.

It can be seen from the results shown in Table 1 that the process for preparing the polyurea resin by using the polyalkylene ether aminobenzoate according to the present invention enables the mixing of the starting materials to be conducted at a low temperature and can provide a room temperature curable resin having excellent mechanical properties.

EXAMPLE 7

While 17.9 g (0.0716 mol) of 4,4'-diphenylmethane diisocyanate and 40.0 g (0.0397 mol) of polytetramethylene ether glycol (PTG) having a molecular weight of 1007 were mixed with stirring in a separable flask, a urethane prepolymer formation reaction was carried out at 80° C. for 3 hours. While the temperature of the resulting prepolymer was kept at 60° C., 36.0 g (0.0308 mol) of PTMA-1 was added thereto, and the mixture was mixed with stirring for 15 minutes. The product was defoamed under reduced pressure and cast into a glass frame to prepare a sheet composed of the polyurethane-urea resin. Curing time and the mechanical properties of the resulting sheet are shown in Table 2 below.

EXAMPLE 8

While 10.4 g (0.0597 mol) of 2,4-tolylene diisocyanate and 40.0 g (0.0397 mol) of PTG having a molecular weight of 1007 were mixed with stirring in a separable flask, a urethane prepolymer formation reaction was carried out at 80° C. for 3 hours. While the temperature of the resulting prepolymer was kept at 60° C., 22.9 (0.0196 mol) of PTMA-1 was added thereto, and the mixture was mixed with stirring for 15 minutes. The product was defoamed under reduced pressure and cast into a glass frame to prepare a sheet composed of the polyurethane-urea resin. Curing time and the mechanical properties of the resulting sheet are shown in Table 2.

EXAMPLE 9

While 8.5 g (0.0488 mol) of 2,4-tolylene diisocyanate and 40.0 g (0.0325 mol) of polycaprolactone polylol (PCLG) having a molecular weight of 1230 (Placcel 212 manufactured by Daicel Chemical Industries, Ltd.) were mixed with stirring in a separable flask, a urethane prepolymer formation reaction was carried out at 80° C. for 3 hours. While the temperature of the resulting prepolymer was kept at 60° C., 18.5 g (0.0158 mol) of PTMA-1 was added thereto, and the mixture was mixed for 15 minutes. The product was defoamed under reduced pressure and cast into a glass frame to prepare a sheet composed of the polyurethane-urea resin. Curing time and the mechanical properties of the resulting sheet are shown in Table 2.

EXAMPLE 10

While 12.5 g (0.0500 mol) of 4,4'-diphenylmethane diisocyanate and 35.0 g (0.0333 mol) of polycarbonate polyol (PCBG) having a molecular weight of 1050 (Nippollan 981 manufactured by Nippon Polyurethane Industry Co., Ltd.) were mixed with stirring in a separable flask, a urethane prepolymer forming reaction was carried out at 80° C. for 3 hours. While the reaction mixture was kept at that temperature, 19.2 g (0.0164 mol) of PTMA-1 was added thereto, and the mixture was mixed for 15 minutes. The product was defoamed under reduced pressure and cast into a glass frame to prepare a sample composed of the polyurethane-urea resin. Curing time and the mechanical properties of the resulting sheet are shown in Table 2.

EXAMPLE 11

While 11.7 g (0.0671 mol) of 2,4-tolylene diisocyanate and 40.0 g (0.0563 mol) of polypropylene glycol (PPG) having a molecular weight of 710 (Excenol 720 manufactured by Asahi Glass Co., Ltd.) were mixed with stirring in a separable flask, a urethane prepolymer formation reaction was carried out at 80° C. for 5 hours. After the urethane prepolymer formation reaction, 25.1 g (0.0108 mol) of PTMA-2 was added thereto at that temperature, and the mixture was mixed with stirring for 15 minutes. The product was defoamed under reduced pressure and cast into a glass frame to prepare a sheet composed of the polyurethane-urea resin. Curing time and the mechanical properties of the resulting sheet are shown in Table 2.

EXAMPLE 12

A urethane prepolymer formation reaction between 10.0 g (0.0343 mol) of liquid MDI and 57.2 g (0.0286 mol) of polypropylene glycol having a molecular weight of 2000 (Actcol P-2020 manufactured by Takeda Chemical Industries, Ltd.) was carried out at 80° C. in a separable flask for 5 hours. Subsequently, 10.3 g (0.0045 mol) of PTMA-2 was added thereto at that temperature, and the mixture was mixed with stirring for 15 minutes. The product was defoamed under reduced pressure and cast into a glass frame to prepare a sheet composed of the polyurethane-urea resin. Curing time and the mechanical properties of the resulting sheet are shown in Table 2.

EXAMPLE 13

A urethane prepolymer formation reaction between 10.0 g (0.0343 mol) of liquid MDI and 23.0 g (0.0228 mol) of PTG having a molecular weight of 1007 was carried out at 80° C. for 3 hours in a separable flask. Subsequently, 25.9 g (0.0112 mol) of PTMA-2 was added thereto at that temperature, and the mixture was mixed with stirring for 15 minutes. The product was defoamed under reduced pressure and cast into a glass frame to prepare a sheet composed of the polyurethane-urea resin. Curing time and the mechanical properties of the resulting sheet are shown in Table 2.

COMPARATIVE EXAMPLE 3

While 10.0 g (0.0574 mol) of 2,4-tolylene diisocyanate and 38.5 g (0.0382 mol) of PTG having a molecular weight of 1007 were mixed with stirring in a separable flask, a urethane prepolymer formation reaction was carried out at 80° C. for 3 hours. Subsequently, 4.9 g (0.0184 mol) of molten MOCA (methylenebis-2-chloroaniline) was added thereto at that temperature, and the mixture was mixed with stirring for 3 minutes. The product was defoamed under reduced pressure and cast into a glass frame to prepare a sheet composed of the polyurethane-urea resin. Curing time and the mechanical properties of the resulting sheet are shown in Table 2.

COMPARATIVE EXAMPLE 4

While 9.4 g (0.0376 mol) of 4,4'-diphenylmethane diisocyanate and 50.0 g (0.025 mol) of PPG having a molecular weight of 2000 (Actcol P-2020) were mixed with stirring, a urethane prepolymer formation reaction was carried out at 80° C. for 5 hours. Subsequently, 3.2 g (0.0119 mol) of molten MOCA (methylenebis-2-chloroaniline) was added thereto at that temperature, and the mixture was mixed with stirring for three minutes. The product was defoamed under reduced pressure and cast into a glass frame to prepare a sheet composed of the polyurethane-urea resin. Curing time and the mechanical properties of the resulting sheet are shown in Table 2.

TABLE 2

| | Urethane Prepolymer Composition Molar Ratio of Isocyanate Compound/Polyol | Urethane-Urea Polymer Composition Molar Ratio of Isocyanate Compound/(Polyol + Amino Compound) | Curing Time at 25° C. (hrs) | Properties of Cured Sheet Tensile Elongation (%) |
|---|---|---|---|---|
| Example | | | | |
| 7 | MT/PTG (1.80) | MT/(PTG + PTMA-1) (1.02) | 2 | 700 |
| 8 | T-100/PTG (1.50) | T-100/(PTG + PTMA-1) (1.01) | 12 | 850 |
| 9 | T-100/PCLG (1.50) | T-100/(PCLG + PTMA-1) (1.01) | 5 | 730 |
| 10 | MT/PCBG (1.50) | MT/(PCBG + PTMA-1) (1.01) | 5 | 750 |
| 11 | T-100/PPG (1.20) | T-100/(PPG + PTMA-2) (1.01) | 24 | 920 |
| 12 | MTL/PPG (1.20) | MTL/(PPG + PTMA-2) (1.01) | 12 | 1100 |
| 13 | MTL/PTG (1.5) | MTL/(PTG + PTMA-2) (1.01) | 2 | 950 |
| Comp. Ex. 3 | T-100/PTG (1.5) | T-100/(PTG + MOCA) (1.01) | 24 | 570 |
| Comp. Ex. 4 | MT/PPG (1.5) | MT/(PPG + MOCA) (1.01) | 24 | 600 |

In Table 2, the term "curing time at 25° C." refers to a time taken until the viscous liquid of the mixture at 25° C. is solidified.

In Table 2, the properties of the cured sheet are values obtained by making the measurement 72 hours after curing according to JIS K-6301.

It can be seen from the results shown in Table 2 that curing for preparing the polyurethane-urea resin can be made at room temperature in a short time and a polyurethane-urea resin having excellent mechanical properties can be obtained according to the process of the present invention, which comprises combining the polyalkylene ether aminobenzoate of the present invention with the urethane prepolymer prepared by properly choosing the polyisocyanate compound and the polyol as the starting materials.

While the present invention has been described in detail and with reference to specific embodiments thereof, it is apparent to one skilled in the art that various changes and modifications can be made therein without departing from the spirit and the scope of the present invention.

What is claimed is:

1. A process for preparing a polyurea resin, which comprises reacting an amino compound represented by formula (I) with a polyisocyanate compound:

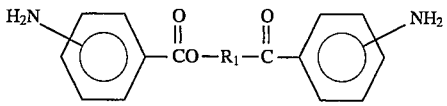

wherein $R^1$ represents a polyalkylene ether group a number average molecular weight of 500 to 5,000 which is composed of, as constituent groups, alkylene ether groups represented by formulas (II) and (III) wherein the groups of formulas (II) and (III) are randomly arranged:

$$-CH_2-CH_2-CH_2-CH_2-O- \quad \text{(II)}$$

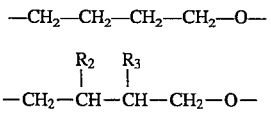

wherein either one of $R^2$ and $R^3$ represents a hydrogen atom, and the other represents a methyl group.

2. A process as in claim 1, wherein the polyisocyanate compound is selected from the group consisting of 4,4'-diphenylmethane diisocyanate, 2,4-tolylene diisocyanate, 2,6-tolylene diisocyanate, a mixture of 2,4-and 2,6-tolylene diisocyanates, m-phenylene diisocyanate, xylylene diisocyanate, hexamethylene diisocyanate, tetramethylene diisocyanate, 1,4-hexylene diisocyanate, 4,4'-biphenylene diisocyanate, 3,3'-dimethoxy-4,4'-biphenylene diisocyanate, 1,5-naphthalene diisocyanate, tetramethylxylene diisocyanate, 4,4'-diphenyl ether diisocyanate, and carbodiimide-modified 4,4'-diphenylmethane diisocyanate.

3. A process as in claim 1, wherein the proportion of the groups of formula (III) is 5 to 40% by weight based on the total amount of the groups of formulas (II) and (III).

4. A process as in claim 1, wherein the molar ratio of the polyisocyanate compound and the amino compound of formula (I) is from 1.0:0.90 to 1.0:0.99.

5. A process as in claim 1, wherein the reaction is conducted at a temperature of 0° to 80° C. for 0.5 to 30 minutes.

6. A process for preparing a polyurethane-urea resin, which comprises reacting an amino compound represented by formula (I) with an isocyanate group-terminated prepolymer:

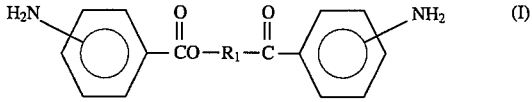

wherein $R^1$ represents a polyalkylene ether group having a number average molecular weight of 500 to 5,000 which is composed of, as constituent groups, alkylene ether groups represented by formulas (II) and (III) wherein the groups of formulas (II) and (III) are randomly arranged:

wherein either one of $R^2$ and $R^3$ represents a hydrogen atom, and the other represents a methyl group.

7. A process as in claim 6, wherein the isocyanate group-terminated prepolymer is one prepared by reacting a polyisocyanate compound and a polyol in a molar ratio of from (1.0:0.85) to (1.0:0.30).

8. A process as in claim 7, wherein the polyisocyanate compound is selected from the group consisting of 4,4'-diphenylmethane diisocyanate, 2,4-tolylene diisocyanate, 2,6-tolylene diisocyanate, a mixture of 2,4-2,6-tolylene diisocyanates, m-phenylene diisocyanate, xylylene diisocyanate, hexamethylene diisocyanate, tetramethylene diisocyanate, 1,4-hexylene diisocyanate, 4,4'-biphenylene diisocyanate, 3,3'-dimethoxy-4,4'-biphenylene diisocyanate, 1,5-naphthalene diisocyanate, tetramethylxylene diisocyanate, 4,4'-diphenyl ether diisocyanate, and carbodiimide-modified 4,4'-diphenylmethane diisocyanate.

9. A process as in claim 7, wherein the polyol is selected from the group consisting of polyethers, polyesters, polyether ester glycols, polyester glycols, polyalkylene glycols, aromatic/aliphatic glycols, and polycarbonate glycols.

10. A process as in claim 6, wherein the reaction is conducted at a temperature of 20° to 80° C. for 10 to 40 to 40 minutes.

* * * * *